(12) United States Patent
Hyun (10) Patent No.: US 11,013,222 B2
(45) Date of Patent: May 25, 2021

(54) FISHING REEL PROVIDED WITH BUSHING FOR ANTI-ELECTROCHEMICAL CORROSION

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/555,238

(22) Filed: Aug. 29, 2019

(65) Prior Publication Data

US 2020/0077633 A1 Mar. 12, 2020

(30) Foreign Application Priority Data

Sep. 7, 2018 (KR) .......................... 10-2018-0107044

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC ............ A01K 89/0189; A01K 89/0186; A01K 89/01929; A01K 89/01931; A01K 89/011222; A01K 89/011223
See application file for complete search history.

(56) References Cited

U.S. PATENT DOCUMENTS

| | | | | |
|---|---|---|---|---|
| 2,775,417 | A * | 12/1956 | Freund ................... | A01K 89/01 242/247 |
| 6,457,662 | B1 * | 10/2002 | Sato ........................ | A01K 89/01 242/247 |
| 2014/0231570 | A1 * | 8/2014 | Ikuta ..................... | A01K 89/015 242/257 |
| 2015/0090823 | A1 * | 4/2015 | Kobayashi ........... | A01K 89/015 242/261 |

FOREIGN PATENT DOCUMENTS

| | | | |
|---|---|---|---|
| JP | 2002186390 | | 7/2002 |
| JP | 2002186390 | A * | 7/2002 |
| KR | 20060045676 | | 5/2006 |
| KR | 100791733 | | 1/2008 |
| KR | 20120033241 | | 4/2012 |
| KR | 20150062981 | | 6/2015 |

* cited by examiner

*Primary Examiner* — Emmanuel M Marcelo
(74) *Attorney, Agent, or Firm* — Cantor Colburn LLP (57) ABSTRACT

Provided is a fishing reel provided with a bushing for anti-electrochemical corrosion. The fishing reel includes: a spool shaft coupled by passing through a spool and having opposite ends axially mounted on a frame; a pinion coupled by being inserted along an outer side of a shaft portion of one side of the spool shaft, thereby controlling on/off rotation of the spool shaft by moving back and forth in a longitudinal direction of the shaft; a bushing made of an insulating material fitted over and coupled with an outer peripheral surface of a body portion of the pinion; and support members supporting the outer peripheral surface of the bushing.

4 Claims, 7 Drawing Sheets

FIG. 1

*Prior Art*

FISHING REEL PROVIDED WITH BUSHING FOR ANTI-ELECTROCHEMICAL CORROSION

BACKGROUND OF THE INVENTION

Field of the Invention

The present invention relates to a fishing reel provided with a bushing for anti-electrochemical corrosion. More particularly, the present invention relates to a fishing reel provided with a bushing for anti-electrochemical corrosion, which prevents electrochemical corrosion due to contact or friction between a pinion and support members from occurring, thereby preventing the pinion and the support members from becoming stuck, wherein the bushing of an insulating material is fitted over an outer peripheral surface of the pinion coupled to a spool shaft to move back and forth in a longitudinal direction of the spool shaft, and the support members support the outer peripheral surface of the bushing.

Description of the Related Art

Figure 1:
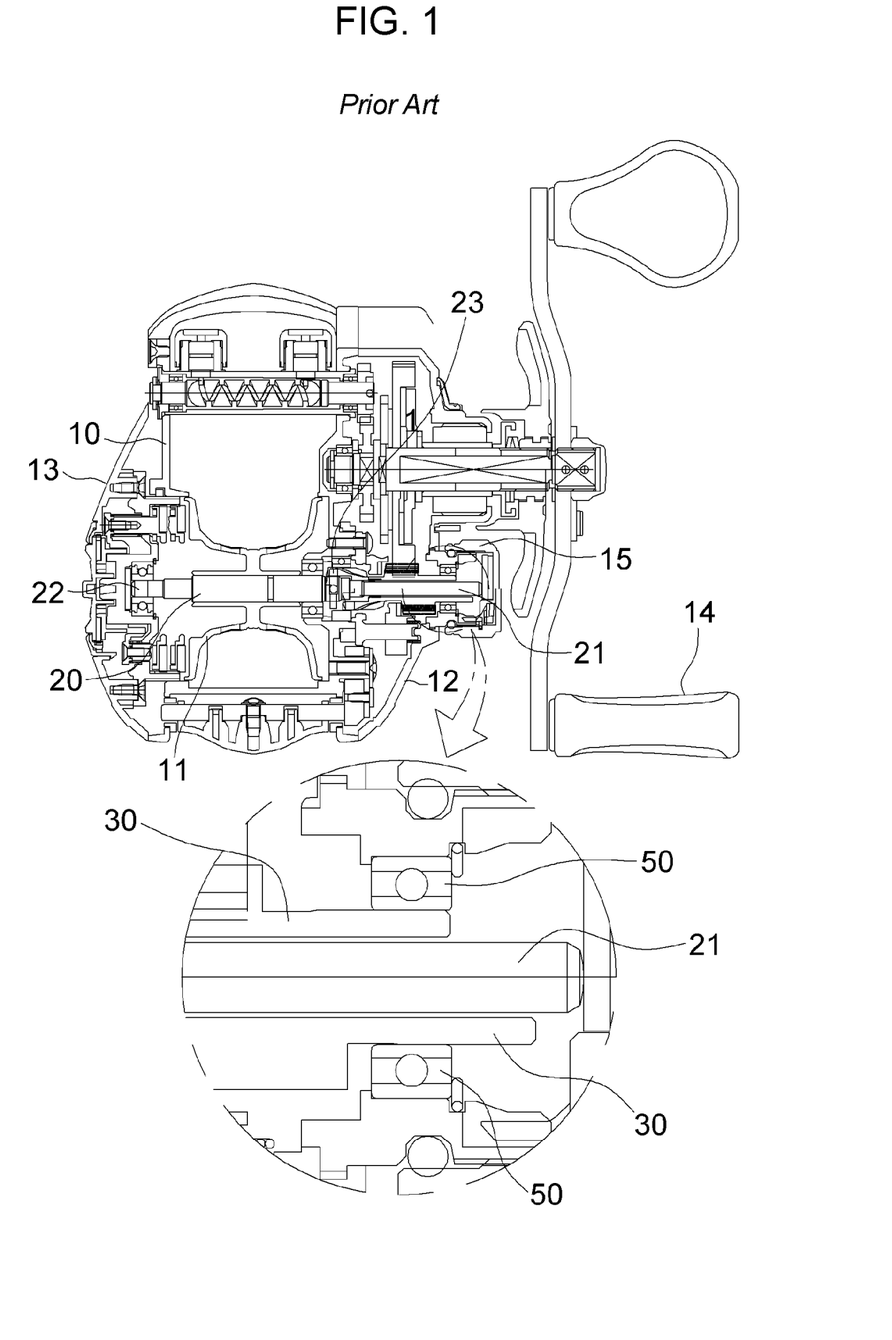
FIG. 1 is a sectional view showing a conventional fishing reel.

In general, a baitcasting reel (hereinafter referred to as a fishing reel) differs only in an operational structure and the like of a brake dial or tension nut according to a braking method of a spool and, as shown in FIG. 1, includes a frame 10 with a spool mounted thereon, a first side cover 12 coupled with one side surface of the frame 10 on a gear side, a second side cover 13 coupled with an opposite side surface of the frame 10 on a palm side, a handle 14 provided on the first side cover 12, and a clutch means controlling on/off rotation of the spool so that the rotation of the spool in conjunction with the handle is established while ensuring the free rotation of the spool 11 during casting.

In a conventional fishing reel as above, opposite ends of the spool shaft 20 extend, wherein one end part is connected to a tension force adjusting part of a tension nut 15 provided on the first side cover 12, and opposite shaft portions 21 and 22 of the spool shaft 20 are axially mounted on support members 50 such as bearings and the like built into the first and second side covers 12 and 13, thereby allowing the spool 11 to rotate.

At this time, a pinion 30 of the clutch means is inserted along an outer side of a first shaft portion 21 of the spool shaft 20, thereby allowing the support members 50 such as bearings and the like to support the pinion 30.

In addition, the pinion 30 is provided with a hollow portion 31 formed by passing through in a longitudinal direction and allowing the first shaft portion 21 of the spool shaft 20 to be inserted thereinto; has a fitting portion 32, at a front end portion, so that the fastening pin 23 of the spool shaft 20 may be latched thereunto and coupled therewith; and is provided with a tooth gear portion 33, with which the drive gear operating in conjunction with a handle engages, at a middle portion.

The fishing reel as above is controlled, in a state where the clutch bar is released (clutch off), to allow the pinion 30 to advance in a spool direction (an inner side), thereby being latched onto and coupled with the spool shaft 20, so that the spool is not allowed to freely rotate but is allowed to be rotated only by the handle 14.

In addition, the fishing reel as above is controlled, in a state where the clutch bar is pressed (clutch on), to allow the pinion 30 to move backward in an opposite direction (outer side) of the spool, thereby being separated from the spool shaft 20, so that the spool 11 is allowed not to operate in conjunction with the handle 14 and is allowed to freely rotate, whereby casting may be performed.

Meanwhile, in the conventional fishing reel, the pinion 30 and the support members 50 such as the bearings are made of metal materials, specifically dissimilar metal materials (brass for the pinion and SUS for the support members), for preventing abrasion.

In addition, when the spool 11 rotates in a state of the clutch off, the pinion 30, which has advanced, rotates along with the spool shaft 20, and friction occurs between the pinion 30 and the support members 50. At this time, a potential difference due to the metal materials is generated between the pinion 30 and the support members 50, and an electrochemical corrosion occurs on a contact surface of the pinion 30 and the support members 50.

When the electrochemical corrosion occurs between the pinion 30 and the support members 50 as described above, the pinion 30 is stuck to the support members 50, thereby causing the back and forth operation thereof to become impossible. Accordingly, there is a problem that the on/off control of the clutch through the back and forth movement of the pinion 30 is unavailable.

For reference, there are related arts such as Korean Patent Application Publication No. 10-2012-0033241, Korean Patent Application Publication No. 10-2015-0062981, Korean Patent Application Publication No. 10-2006-0045676, Korean Patent No. 10-0791733, and the like.

SUMMARY OF THE INVENTION

Accordingly, the present invention has been made keeping in mind the above problems occurring in the related art, and an objective of the present invention is to provide a fishing reel provided with a bushing made of an insulating material such as plastic and the like and interposed between a pinion and support members in order to prevent the pinion from becoming stuck due to electrochemical corrosion, which occurs on the contact surface of the pinion and the support members due to a potential difference caused by contact or friction between the pinion and the support members, which are metal materials.

In order to achieve the above objective, the fishing reel according to the present invention includes: a spool shaft coupled by passing through a spool and having opposite ends axially mounted on a frame; a pinion coupled by being inserted along an outer side of a shaft portion of one side of the spool shaft, thereby controlling on/off rotation of the spool shaft by moving back and forth in a longitudinal direction of the spool shaft; a bushing made of an insulating material fitted over and coupled with an outer peripheral surface of a body portion of the pinion; and support members supporting the outer peripheral surface of the bushing.

In addition, the fishing reel according to the present invention may include an anti-separation means provided in the pinion, the bushing, or both, thereby preventing the bushing from being separated from the pinion.

In addition, in the fishing reel according to the present invention, the anti-separation means may include a first latching portion and a second latching portion latching onto and coupling with each other at a contact surface of the pinion and the bushing.

Further, in the fishing reel according to the present invention, the anti-separation means may include a first thread tap and a second thread tap being screwed to couple with each other at a contact surface of the pinion and the bushing.

As described above, the fishing reel, provided with the bushing for anti-electrochemical corrosion according to the present invention, is provided with the bushing made of the insulating material on an outer peripheral surface of the pinion, and the outer peripheral surface of the bushing is supported by the support members such as bearings, wherein the pinion is used to control the free rotation of the spool shaft by on/off of the clutch. Accordingly, the electrochemical corrosion, due to the potential difference caused by metal friction, is prevented from occurring. As a result, the pinion is not stuck to the support members, so the fishing reel can be stably used for a long time without the need for post-management for preventing the corrosion.

In addition, by preventing the bushing from being separated from the pinion by an anti-separation means, the bushing can be prevented from being lost when the fishing reel is disassembled and then reassembled.

Furthermore, by simplifying an anti-separation structure of the pinion and the bushing, it is possible to provide effects to secure manufacturing manageability and to reduce a manufacturing cost.

BRIEF DESCRIPTION OF THE DRAWINGS

The above and other objectives, features, and advantages of the present invention will be more clearly understood from the following detailed description when taken in conjunction with the accompanying drawings, in which.

DETAILED DESCRIPTION OF THE INVENTION

Since the present invention may be modified in various ways and have various forms, implementation aspects (or embodiments) will be described in detail in the text. However, this is not intended to limit the present invention to the specific form disclosed and should be understood to include all modifications, equivalents, and substitutes included in the spirit and scope of the present invention.

In each of the drawings, the reference numerals that have, in particular, the same tens and units digits, or the same tens and units digits and alphabets, refer to the members having same or similar functions, and unless explicitly stated otherwise, members referred to by each reference numeral in the drawings may be regarded as a member conforming to these criteria.

In addition, in the drawings, the components are expressed in size or thickness as exaggeratedly large (or thick) or small (or thin) or expressed in simplified in consideration of the convenience of understanding and the like, but the scope of protection of the present invention should not be limitedly interpreted thereby.

The term used herein is for the purpose of describing particular implementation aspects (or embodiments) only and is not intended to limit the present invention. Singular expressions include plural expressions unless the context clearly indicates otherwise.

In this application, the term "comprises", "consists", or the like is intended to indicate that a feature, number, step, operation, component, part, or a combination thereof described in the specification is to be present. That is, it is to be understood that the present invention does not exclude the possibility of the presence or the addition of at least one of other features, numbers, steps, operations, components, parts, or combinations thereof.

Unless defined otherwise, all terms used herein, including technical or scientific terms, have the same meaning as commonly understood by one of ordinary skill in the art. Terms such as those defined in the commonly used dictionaries should be construed as having meanings consistent with the meanings in the context of the related art and shall not be construed in ideal or excessively formal meanings unless expressly defined in this application.

Terms such as "the first", "the second", and the like stated in the present specification are referred only to differentiate components different from each other and are not limited to the order of manufacture thereof, and names thereof used in the description and the claims may not coincide with each other.

Figure 2:
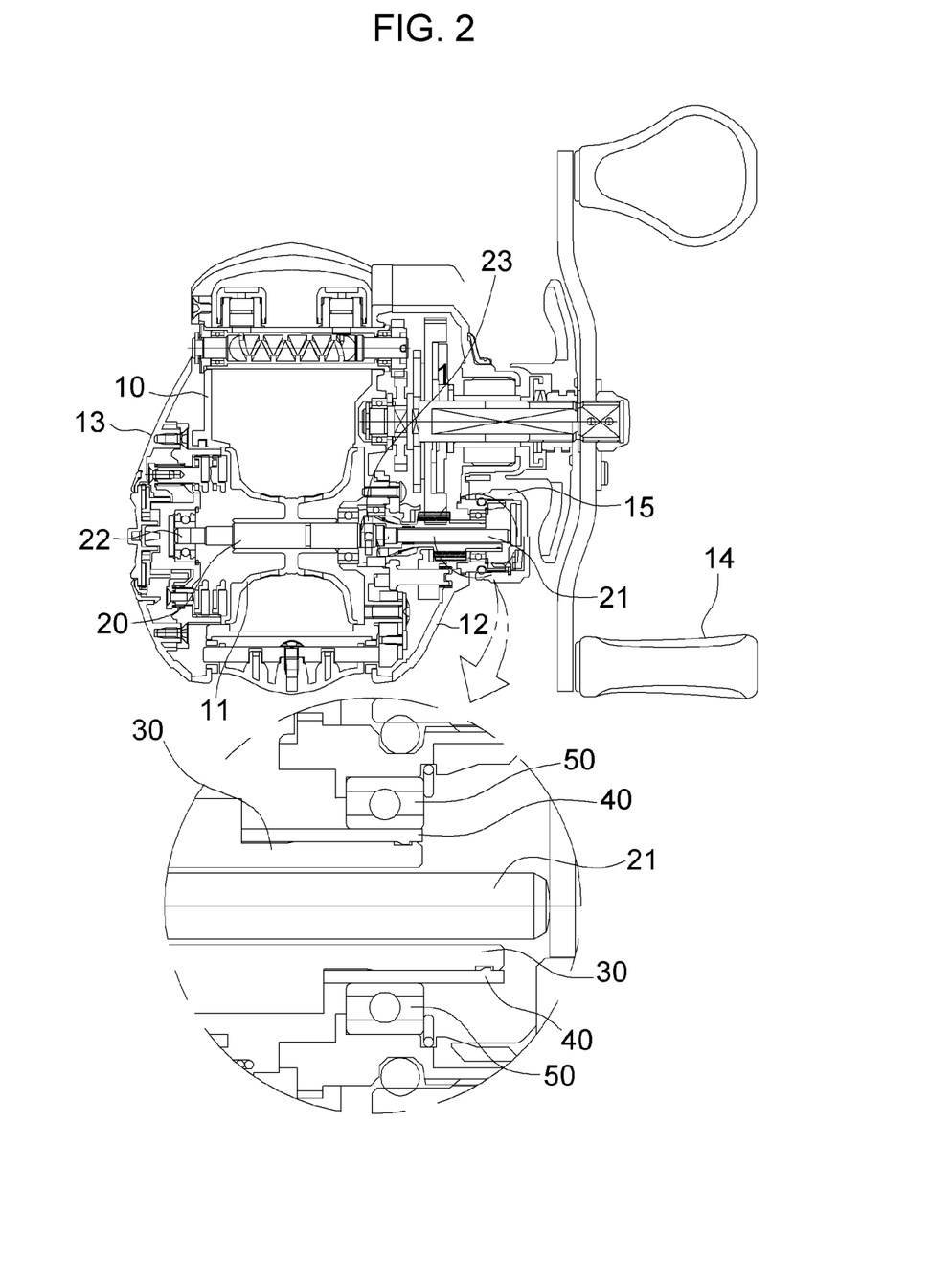
FIG. 2 is a sectional view showing a fishing reel according to the present invention.

In describing a fishing reel provided with a bushing for anti-electrochemical corrosion according to the present invention, for convenience, a non-strict approximate reference direction is specified with reference to FIG. 2. First, the direction to which the gravity applies is set as a downward side. Then upward, downward, leftward and rightward sides are defined as the directions as the drawing is viewed. Even in the description and claims of the invention associated with the other drawings, unless explicitly stated otherwise, the direction is specified and described in accordance with an above-described standard.

Hereinafter, the fishing reel provided with the bushing for anti-electrochemical corrosion according to the present invention will be described with reference to the accompanying drawings.

Figure 3A:
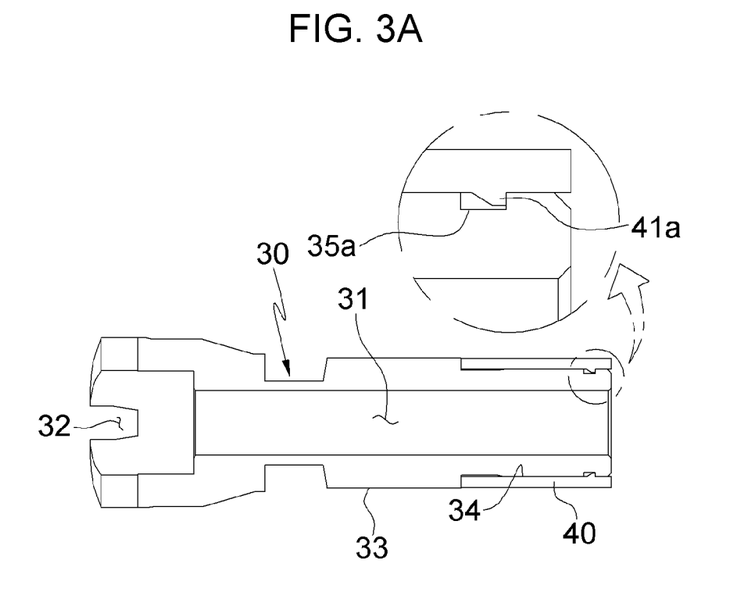
FIGS. 3A to 3G are sectional views showing embodiments of anti-separation means according to the present invention.
Figure 3B:
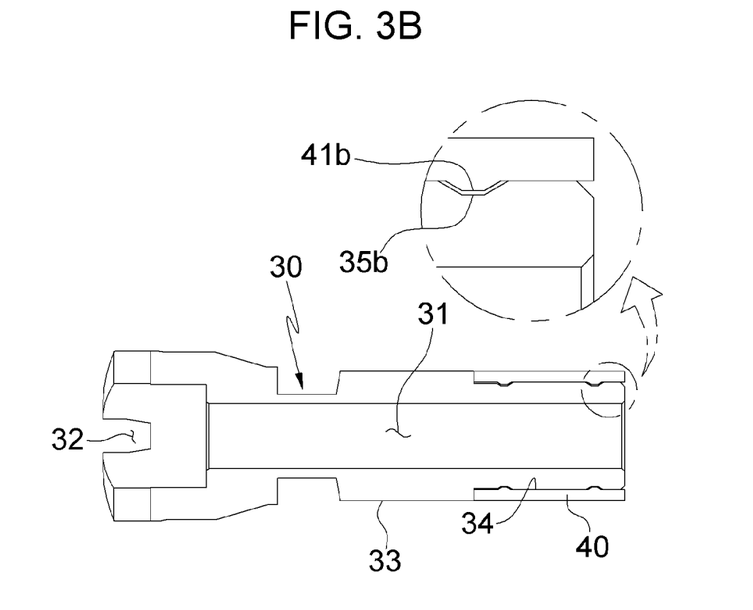
Figure 3C:
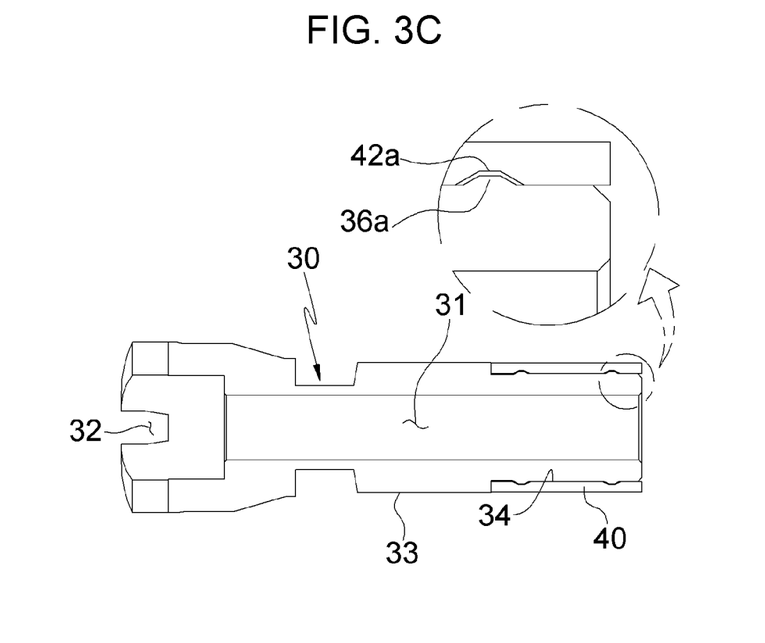
Figure 3D:
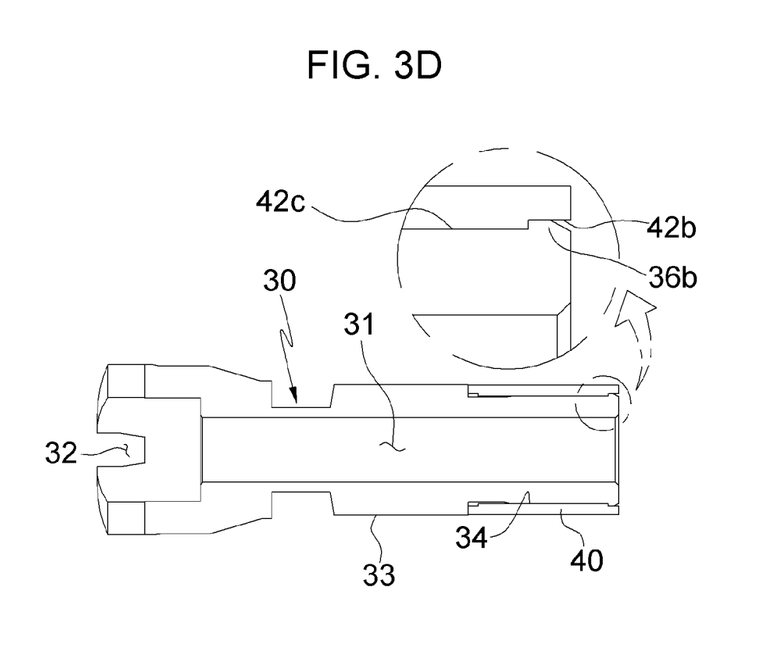
Figure 3E:
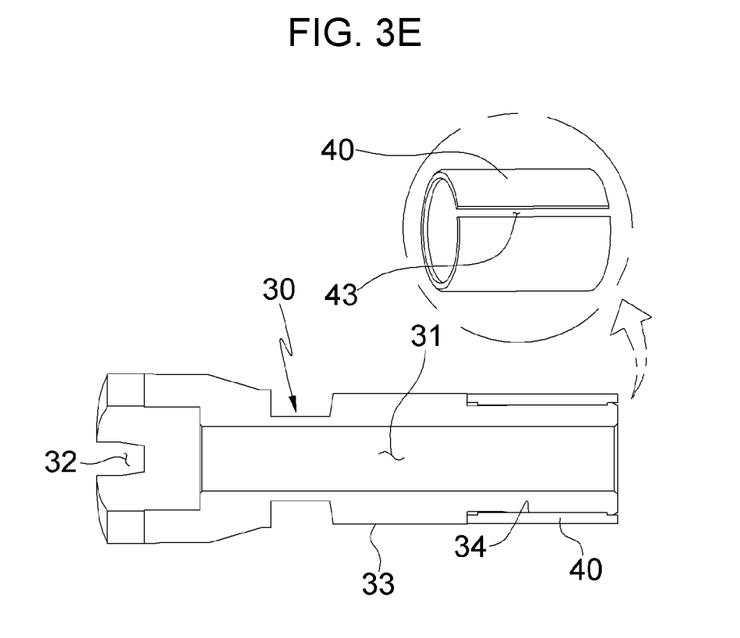
Figure 3F:
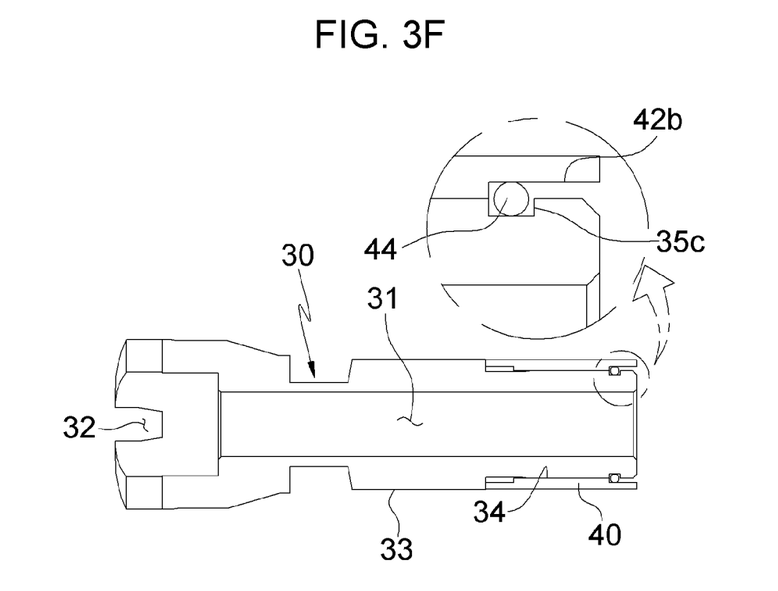
Figure 3G:
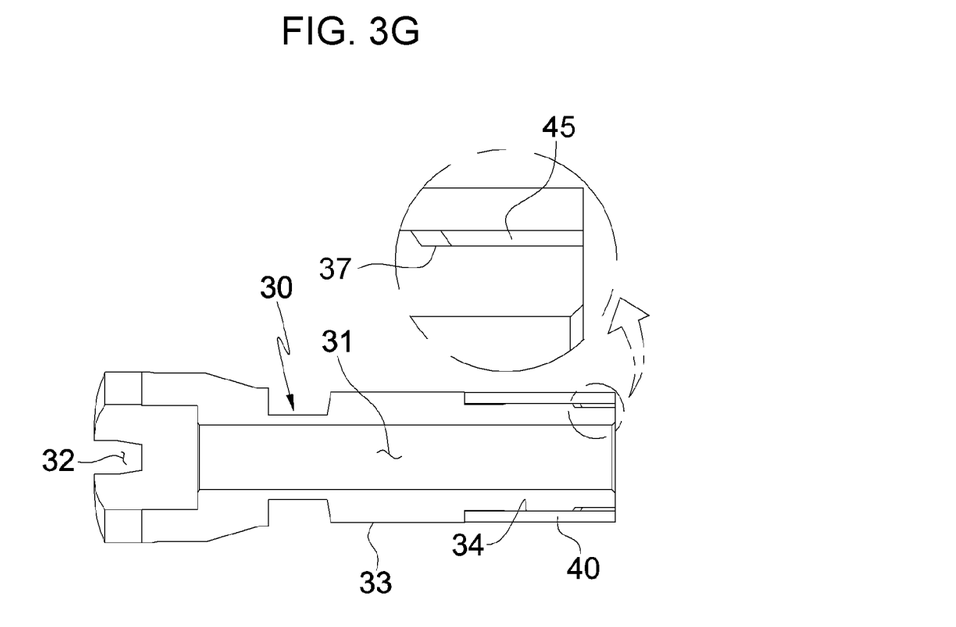
Figure 4:
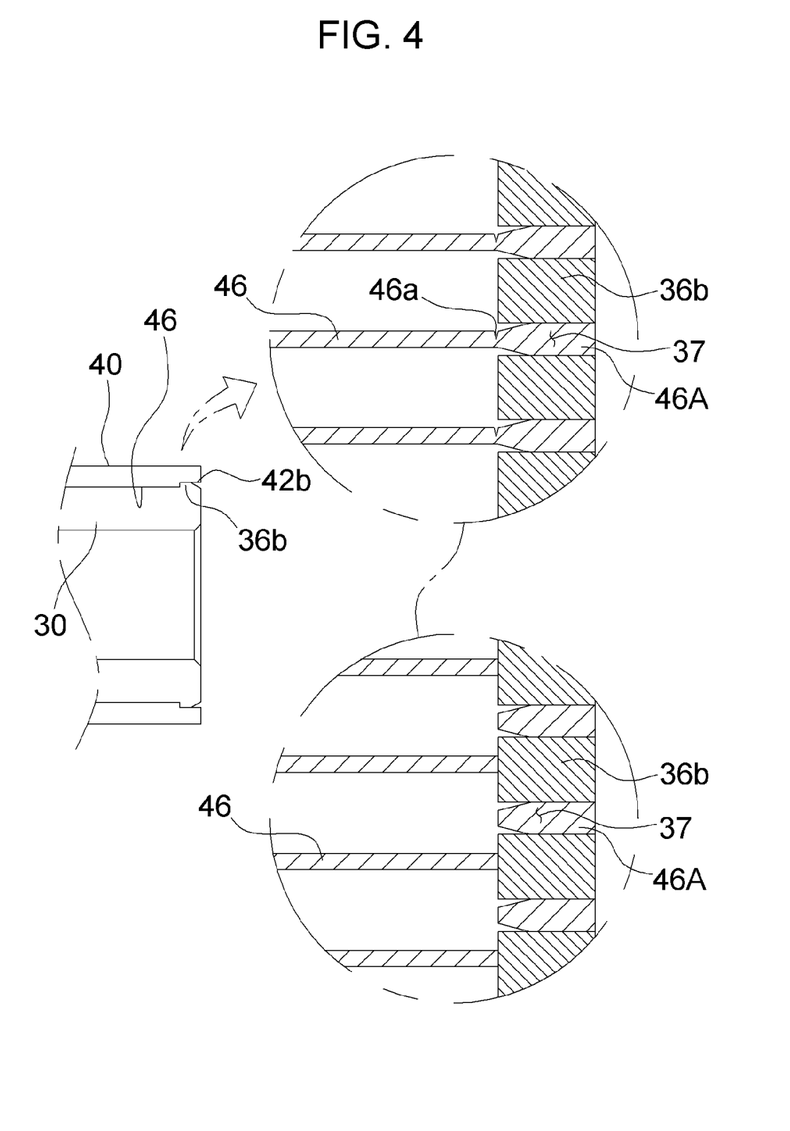
FIG. 4 is a sectional view showing a modified anti-separation means according to the present invention.

As shown in FIGS. 2 to 4, the present invention relates to the fishing reel that is provided with a clutch means using a pinion operating back and forth and includes: a spool shaft 20 axially mounted on a frame 10 (more strictly, opposite side covers 12 and 13) so that a spool 11 is to rotate; a pinion 30 coupled to the spool shaft 20 to operate back and forth in a longitudinal direction, thereby performing a clutch operation; a bushing 40 coupled with the pinion 30; support members 50 rolling to support the bushing 40; and an anti-separation means fixing the bushing 40 to the pinion 30.

The spool shaft 20 is coupled by passing through the spool 11, and opposite ends thereof are axially mounted on the side covers 12 and 13, respectively, of the frame 10.

The spool shaft 20 has opposite shaft portions 21 and 22 extending to opposite sides of the spool 11 (the first shaft portion 21 connected to a tension nut 15 is provided to be longer than the second shaft portion 22 directly connected to the second side cover 13). Meanwhile, the spool 11 is inserted along an outer side of the spool shaft 20 between the opposite shaft portions 21 and 22, and the spool shaft 20 serves as a rotation shaft for the rotation of the spool 11.

In addition, the spool shaft 20 is coupled to the inside of the first shaft portion 21 in a longitudinal direction of the first shaft portion 21 wherein the fastening pin 23 is perpendicular to the longitudinal direction of the first shaft portion 21, and the fastening pin 23 protrudes from the outer peripheral surface of the first shaft portion 21.

The pinion 30 is provided with a hollow portion 31 formed by passing through in a longitudinal direction, thereby allowing the spool shaft 20 (more strictly, first shaft portion 21) to be inserted thereinto; and moves back and forth in a longitudinal direction of the shaft through an operation of the clutch bar of the clutch means including a yoke, thereby performing an on/off control of the rotation of the spool shaft 20.

Specifically, the pinion 30 is provided with a fitting portion 32 formed at a front end portion of an inner side (left side on the drawing) so that the fastening pin 23 may be fitted thereinto and coupled therewith; a tooth gear portion 33, with which the drive gear operating in conjunction with a handle 14 engages, is provided on an outer peripheral surface of a middle portion; and a seating portion 34 having a smaller outer diameter than the tooth gear portion 33 is formed at a rear end portion of an outer side (right side on the drawing), so that the bushing 40 is fitted over and coupled with the seating portion 34.

In a state where the pinion 30 has advanced by the clutch bar, the fitting portion 32 latches onto and couples with the fastening pin 23, so that the spool shaft 20 is restrained to the drive gear engaged with the pinion 30, thereby allowing the spool 11 to be rotated only by the handle 14.

In a state where the pinion 30 has moved backward by the clutch bar, the fitting portion 32 is separated from the fastening pin 23, so that the restraint of the spool shaft 20 and the pinion 30 is released, and thus the spool shaft 20 does not rotate in conjunction with the pinion 30 (that is, only the spool shaft 20 idles with respect to the pinion 30), thereby allowing the spool 11 to be freely rotated.

The spool shaft 20 has opposite side shaft portions 21 and 22 fitted into the support members 50 such as bearings and the like so as to reduce friction during rotation. At this time, the conventional fishing reel may not be possible to directly support the first shaft portion 21 with the support members 50 due to the connection of the first shaft portion 21 with the tension nut 15. Accordingly, the rear end (outer end side of the tooth gear portion 33) of a body portion of the pinion 30, into which the first shaft portion 21 is fitted, has to be supported by the support members 50.

In the conventional fishing reel as above, when the pinion 30 rotates along with the spool shaft 20, a potential difference occurs due to contact or friction between the pinion 30 and the support members 50, which are metal materials, thereby causing electrochemical corrosion. As the electrochemical corrosion occurs on a contact surface of the pinion 30 and the support members 50, there is a problem of occurrence of a phenomenon where the pinion 30 is stuck such that the pinion 30 may not be possible to move back and forth in the longitudinal direction of the spool shaft 20.

On the other hand, the present invention prevents the occurrence of the electrochemical corrosion due to the potential difference by interposing the bushing 40 made of an insulating material between the pinion 30 and the support members 50.

Specifically, the bushing 40 is fitted over the outer peripheral surface of the body portion of the pinion 30 and is made of an insulating material, such as synthetic resin of plastics, which may block electricity and conduction of heat.

The bushing 40 is a pipe-shaped member corresponding to the body portion of the pinion 30, and is coupled by tight fit into the seating portion 34 of the pinion 30 by press-fitting. At this time, the outer diameter of the bushing 40 is the same size as the outer diameter of the body portion of the pinion 30, thereby allowing a height step not to be formed between the bushing 40 and the body portion of the pinion 30.

In addition, the bushing 40 is fixed to the seating portion 34 of the pinion 30 through a press-fit structure using a diameter difference as well as an anti-separation means that is to be described later, thereby, when the fishing reel is disassembled, preventing the bushing 40 from being separated from the pinion 30 and being lost.

In addition, the support members 50 support the outer peripheral surface of the insulating bushing 40.

Here, various known bearings or friction reducing bushings may be used for the support members 50, and there is no limitation on the specific form or support structure.

In the present invention having the above-described configuration, the insulating bushing 40 is interposed between the pinion 30 and the support members 50, which are metal materials, so that the pinion 30 does not directly rub against the support members 50 even when the pinion 30 rotates. Therefore, by preventing the occurrence of the potential difference between the pinion 30 and the support members 50, it is possible to prevent the occurrence of the electrochemical corrosion on the contact surface of the pinion 30 and the support members 50.

Furthermore, as shown in FIGS. 3A to 3G, the present invention includes the anti-separation means provided in the pinion 30, the bushing 40, or both and preventing the bushing 40 from being separated from the pinion 30.

The anti-separation means allows the bushing 40 to latch onto and couple with (a concept including a screw coupling structure) the seating portion 34 of the pinion 30 and is satisfying when a structure thereof is capable of preventing the bushing 40 from falling out of the pinion 30. In addition, there is no limit on the form and the like.

Hereinafter will be described in more detail embodiments of the anti-separation means for improving the assembly and reducing the manufacturing cost.

First, a first embodiment of the anti-separation means includes a first latching portion and a second latching portion which latch onto and couple with each other at the contact surface of the pinion 30 and the bushing 40.

Specifically, the first and second latching portions are structures formed to be protruded and/or indented in a shape corresponding to each other. When the bushing 40 is fitted over the seating portion 34 by press-fitting, the first and second latching portions latch onto and couple with each other, thereby preventing the bushing 40 from being separated and broken away from the pinion 30. Meanwhile, specific forms or structures of the first embodiment are shown in FIGS. 3A to 3F.

First, as shown in FIG. 3A, a hook-shaped first binding protrusion 41a protrudes from an inner peripheral surface of the bushing 40 to form a first latching portion, and a groove-shaped first binding groove 35a is indented from an outer peripheral surface of the seating portion 34 of the pinion 30 to form a second latching portion. Subsequently, when the bushing 40 is fitted over the seating portion 34 by the press-fitting, the first binding protrusion 41a is latched onto the first binding groove 35a, thereby preventing the bushing 40 from being separated.

Second binding protrusions 41b and second binding grooves 35b shown in FIG. 3B illustrate an embodiment in which two protrusions and two grooves are provided, unlike FIG. 3A. In the embodiment of FIG. 3A, the first binding protrusion 41a protrudes in a triangle to have a hook shape for the unidirectional coupling of the bushing 40. Whereas, there is a difference in the embodiment of FIG. 3B in that each of the second binding protrusions 41b and each of the second binding grooves 35b, having a trapezoid shape corresponding to each other for bidirectional coupling of the bushing 40, are provided at the same position of each corresponding side of inside and outside of the bushing 40 and the seating portion 34, respectively.

The embodiment shown in FIG. 3C is an embodiment in which protrusions and grooves are provided inversely in their positions compared to the protrusions and grooves provided in FIG. 3B. That is, third binding protrusions 36a are formed by protruding from the outer peripheral surface of the seating portion 34, and third binding grooves 42a are formed by indenting the inner peripheral surface of the bushing 40.

In the embodiment shown in FIG. 3D, fourth binding protrusions 36b protrude from opposite end portions of the outer side of the seating portion 34, and fourth binding grooves 42b are formed at opposite end portions of the inner peripheral surface of the bushing 40, respectively. The latching end portion 42c, which the fourth binding protrusions 36b latch onto, protrudes between the fourth binding grooves 42b, and the fourth binding protrusions 36b and the latching end portion 42c respectively function as latching portions.

At this time, the depth and length of each of the fourth binding grooves 42b are formed to be same, thereby allowing the latching end portion 42c to be always latched onto the fourth binding protrusions 36b. Therefore, the embodiment of FIG. 3D also allows the bushing 40 to be assembled bidirectionally by being fitted in any direction without discriminating left and right sides.

The embodiment shown in FIG. 3E is a modification example of the embodiment shown in FIG. 3D and is provided with the fourth binding protrusions 36b, the fourth binding grooves 42b, and the latching end portion 42c the same as in FIG. 3D. However, in the embodiment shown in FIG. 3E, an incision portion 43, which one side surface of the bushing 40 is cut in the longitudinal direction, is further provided, thereby facilitating the assembly of the bushing 40 by enlarging the diameter of the bushing 40 by the incision portion 43.

In the embodiment shown in FIG. 3F, the bushing 40 has a structure the same as in FIG. 3D, and the fitting groove 35c is formed concave on the outer peripheral surface of the seating portion 34 at a position corresponding to the fourth binding groove 42b, which is at an outer side. In addition, the anti-separation ring 44 having an outer diameter greater than the outer diameter of the seating portion 34 is fitted over the fitting groove 35c, and the latching end portion 42c is latched onto the anti-separation ring 44.

A C-shaped ring, which is a circular ring with a portion thereof being cut off and thus opposite ends thereof being separated, is used for the anti-separation ring 44 for the convenience of assembly. The embodiment of FIG. 3F also allows the bushing 40 to be assembled freely by being fitted without discriminating left and right directions.

Next, as shown in FIG. 3G, a second embodiment of the anti-separation means includes a first thread tap 37 and a second thread tap 45 screwed to couple with each other at a contact surface of the pinion 30 and the bushing 40.

The first and second thread taps 37 and 45 are female and male thread portions corresponding to each other and rotate the bushing 40 clockwise when the bushing 40 is fitted over the seating portion 34, whereby thread taps are screwed to couple with each other and the bushing 40 is allowed to be fixedly coupled to the seating portion 34.

At this time, only when a first thread tap 37, which is a male thread portion, is formed to have a height lower than an outer peripheral surface of the seating portion 34 at an end portion of the outer side of the seating portion 34, and a second thread tap 45, which is a female thread portion and corresponds to the first thread tap 37, is formed to protrude from an inner peripheral surface of the bushing 40, the bushing 40 may be screwed to couple with the seating portion 34.

Meanwhile, in FIG. 4, a modification of the embodiment shown in FIG. 3C is shown as an example to further secure the anti-separation of the bushing 40.

Specifically, the fourth binding protrusion 36b protrudes from an end portion of the outer side of the seating portion 34, wherein a plurality of insertion grooves 37, formed in the fourth binding protrusion 36b by being opened in the longitudinal direction of the pinion 30, is provided spaced apart by a predetermined interval in the circumferential direction of the fourth binding protrusion 36b.

A plurality of engaging pieces 46 protruded to be possibly fitted into the insertion grooves 37 is provided on the inner peripheral surface of the bushing 40, being spaced apart by the interval the same as the insertion grooves 37 in the circumferential direction of the bushing 40. Here, each engaging piece 46 has a smaller width than each insertion groove 37 and a fitting end portion 46A connected to the outer end portion thereof and having a thickness (width) that is slightly greater than the insertion groove 37. In addition, a breakage portion 46a cut into a groove shape is provided between the engaging piece 46 and the fitting end 46A.

When the bushing 40 is fitted over the seating portion 34 in the longitudinal direction, the fitting end portion 46A is coupled by tight fit to the insertion groove 37 and fixed. Then, when the bushing 40 is rotated in one direction, the breakage portion 46a is cut off between the engaging piece 46 and the fitting end 46A, and an end part of the outer side of the engaging piece 46 is caught by an end part of the inner side of the fourth binding protrusion 36b. That is, when the bushing 40 is rotated, the fitting ends 46A are cut off and separated from the inner peripheral surface of the bushing 40 and the engaging piece 46, thereby being remained in the insertion groove 37, and only the engaging pieces 46 rotate together with the bushing 40 and the engaging pieces 46 become to be caught by the fourth binding protrusions 36b.

To summarize, the engaging piece 46 and the fitting end 46A are connected to each other in the longitudinal direction of the bushing 40, wherein the engaging piece 46 is formed to have a thickness smaller than the fitting end 46A, the tip end of the fitting end 46A, the width of which becomes smaller toward the inner side, is connected to the engaging piece 46, and the breakage portion 46a is provided at an inner side of the tip end of the fitting end 46A.

In addition, although not shown in the drawing, the fitting end 46A has cutting grooves each formed at opposite sides so that the fitting end 46A may be easily cut off at the inner peripheral surface of the bushing 40. Accordingly, the bushing 40 and the fitting end 46A are connected to have a sectional structure shaped as " ".

In addition, each insertion groove 37 and the corresponding fitting end 46A are formed to have thicknesses (widths) and intervals different from one another (in FIG. 4, the same thicknesses and widths are shown for convenience of understanding).

Accordingly, when the bushing 40 is fitted over the seating portion 34 by fitting the respective fitting ends 46A to the respective insertion grooves 37, the engaging pieces 46 having small widths are fitted into the insertion grooves 37. Subsequently, when the end fittings 46A enter into the insertion grooves 37, the bushing 40 is press-fitted with a strong pressure, whereby the end fittings 46A are coupled by tight fit with the corresponding insertion grooves 37 so that primary fixing is achieved for the bushing 40.

In this state, when the bushing 40 is rotated in one direction, a connection portion of the breakage portion 46*a* and the engaging piece 46 is broken. In a state where only the fitting ends 46A remain in the insertion grooves 37, the bushing 40 and the engaging pieces 46 rotate together. Each engaging piece 46 separated as above has an end portion, of the outer side thereof, caught by the end portion of the inner side of the fourth binding projection 36*b*, thereby completing the secondary fixing of the bushing 40. Accordingly, the bushing 40 is prevented from falling out of the seating portion 34.

In particular, because the thickness (width) of each of the insertion grooves 37 and the interval between adjacent insertion grooves 37 are formed to be different from one another, the thicknesses of the fourth binding protrusion 36*b* are also different from one another. Accordingly, even though the assembled bushing 40 rotates on the seating portion 34, it is practically impossible for each engaging piece 46, which has been cut, to be arranged one-to-one in a position that corresponds to the groove 37 that the engaging piece 46 was first inserted into. Even though each of the engaging pieces 46 and each of the insertion grooves 37 are arranged on a line to match the corresponding same thickness, due to the fitting ends 46A that has been inserted into the insertion grooves 37, the engaging pieces 46 do not fall into the insertion grooves 37, whereby the combined bushing 40 is fixed semi-permanently on the seating portion 34.

Through the anti-separation means described above, in the present invention, the bushing is prevented from being separated and broken away from the pinion, thereby prevented from being lost when the fishing reel is disassembled. In addition, due to the bushing 40 fixed to the pinion 30, the electrochemical corrosion due to the friction of the pinion 30 and the support members 50 is not generated, thereby preventing the pinion 30 from becoming stuck. As a result, the clutch function of the fishing reel may be stably used for a long time.

In the above description of the present invention, the fishing reel provided with the bushing for anti-electrochemical corrosion has been described with reference to the accompanying drawings. However, various modifications, changes and substitutions may be made by those skilled in the art, and such modifications, changes and substitutions should be construed as falling within the protection scope of the present invention.

What is claimed is:

1. A fishing reel provided with a bushing for anti-electrochemical corrosion, the fishing reel comprising:
   a spool shaft passing through a spool and having opposite ends axially mounted on a frame;
   a pinion inserted along an outer side of one side of the spool shaft, configured to control on/off rotation of the spool shaft by moving back and forth in a longitudinal direction of the spool shaft, and formed with a seat portion having an outer diameter smaller than that of a tooth portion of the pinion;
   a bushing made of an insulating material, and tightly fitted on an outer peripheral surface of the seat portion of the pinion;
   support members supporting an outer peripheral surface of the bushing and reducing rotational friction; and
   an anti-separation means provided in the pinion and the bushing, and configured to allow the bushing to latch onto and couple with the seating portion.

2. The fishing reel of claim 1, wherein the anti-separation means comprises: a first latching portion formed in the pinion; and a second latching portion formed in the bushing, the first latching portion and the second latching portion being latched onto each other.

3. The fishing reel of claim 2, wherein the first latching portion includes: a first thread tap formed in the seat portion of the pinion; and the second latching portion includes: a second thread tap formed in the bushing, the first thread tap and the second thread tap being screwed with each other.

4. The fishing reel of claim 2, wherein the first latching portion includes: a binding protrusion formed on the seat portion of the pinion, wherein the binding protrusion includes a plurality of insertion grooves formed along a longitudinal direction of the seat portion and at a first predetermined interval along a circumferential direction of the seat portion; and the second latching portion includes: a plurality of engaging pieces formed on an inner peripheral surface of the bushing along a longitudinal direction of the busing and at a second predetermined interval corresponding to the first predetermined interval, and
   each of the engaging pieces includes: a fitting end portion, which is configured to tightly fit inside a corresponding insertion groove when the bushing is inserted into the seat portion; a remaining portion thereof; and a breakage portion between the fitting end portion and the remaining portion, wherein the breakage portion is configured to be broken when rotating the busing in a direction after inserted into the seat portion of the pinion, thereby the fitting end portion being separated from the bushing.

* * * * *